Patented Dec. 29, 1925.

1,567,847

UNITED STATES PATENT OFFICE.

JINSHICHI KATO, OF KYOTO, JAPAN.

INJECTION FOR HEMORRHOIDS.

No Drawing.     Application filed October 4, 1920.   Serial No. 414,640.

*To all whom it may concern:*

Be it known that I, JINSHICHI KATO, a subject of the Emperor of Japan, residing at No. 33, Ekando-cho. Kamikyo-ku, Kyoto, Japan, have invented certain new and useful Improvements in Injection for Hemorrhoids; and I do hereby declare the following to be a full, clear, and exact description of the invention, such as will enable others skilled in the art to which it appertains to make and use the same.

This invention relates to an injection for hemorrhoids prepared from fine powder of metallic magnesium or electric colloid of same, mixed with a liquid, such as glycerine, olive oil or liquid paraffin, which is harmless to human bodies and which works no chemical change on the said metallic magnesium. It has for its object to produce a curative injection for hemorrhoids with strong effect.

Several injections have been already known for the cure of hemorrhoids. Carbolic acid, with or without the admixture of water, glycerine or alcohol, iodoform-ether, the mixture of urea hydrochloride and quinine, adrenalin, alcohol, hot water, chloral hydrate, or ergot are the principal ingredients of the commonly known injections for the same disease.

All of them are either a liquid or a solution, and their medical result is questionable. Some cause gangrene of the local tissue, others cause embolism, and the occurrence of a general disorder is not also infrequent.

I have discovered that when fine powder of pure metallic magnesium mixed with glycerine or the like is injected into a hemorrhoidal knot, the blood in the latter coagulates itself in a few minutes, and after two or three days the local tissue shrinks up gradually, and finally it shrivels up by itself in a week or two.

It is already known that metallic magnesium was tried by some German experts as a remedy for angioma about twenty years ago, but nothing is disclosed further than that metallic magnesium is an effective remedy for angioma, and it has never been tried for the cure of other disorders. My new discovery has been applied in more than three hundred cases, and it has been demonstrated beyond question that powdered metallic magnesium, when injected into the local tissue, has wonderful power for the complete cure of hemorrhoids.

In practicing the invention, the metallic magnesium must not only be chemically pure but must be rather finely divided. Metallic magnesium of the best grade of fineness for this purpose is obtained by sifting it through with a screen of 35 meshes per millimeter, and 4 grams of the fine powder of magnesium thus obtained is mixed with 100 cubic centimeter of pure glycerine, olive oil, or liquid paraffin. Of course, this ratio of mixing materials may be modified according to the condition of disorder. The so-called electric colloid of magnesium, which may be alternatively employed, is prepared as follows: Fine powdered magnesium is mixed with the liquid, such as glycerine and a moderate electric current is discharged into this mixture while it is being stirred this current discharge being effected by means of the secondary of an induction coil with a condenser in parallel connection. In a short time dispersion takes place, and magnesium-sol may be obtained. In practice, the mixture is preferably maintained in a hydrogen or nitrogen atmosphere and is cooled in any convenient manner. In this way decomposition of the liquid, with consequent production of an impure sol containing carbon or other impurities is avoided.

The novel mixed liquid injection above described being chemically stable in character, the action of the liquid is reliably constant. It should be injected into the middle of a hemorrhoidal knot in amounts of from one to three drops at a time by means of a needle and a syringe of a special make and form for this purpose.

What I claim is:—

1. An injection for hemorrhoids prepared from electric colloid of metallic magnesium mixed with a liquid, which is harmless to the human body and which works no chemical change on the said metallic magnesium.

2. An injection for hemorrhoids prepared from electric colloid of metallic magnesium mixed with an oily liquid harmless to the human body and without substantial chemical action on said metallic magnesium.

3. An injection for hemorrhoids prepared from an electric colloid of metallic magnesium mixed with an oily liquid harmless to the human body and without substantial chemical action on said metallic magnesium, in the proportion of about 4 grams of magnesium per 100 cubic centimeters of liquid.

In testimony whereof I hereunto affix my signature.

JINSHICHI KATO.